(12) United States Patent
Wang et al.

(10) Patent No.: US 9,988,495 B2
(45) Date of Patent: Jun. 5, 2018

(54) OLIGOMER ADDITIVE AND LITHIUM BATTERY

(71) Applicants: National Taiwan University of Science and Technology, Taipei (TW); Industrial Technology Research Institute, Hsinchu (TW)

(72) Inventors: Fu-Ming Wang, Taipei (TW); Bing-Joe Hwang, Taipei (TW); Chorng-Shyan Chern, Taipei (TW); Jung-Mu Hsu, Taipei (TW); Jing-Pin Pan, Taipei (TW); Chang-Rung Yang, Taipei (TW)

(73) Assignees: National Taiwan University of Science and Technology, Taipei (TW); Industrial Technology Research Institute, Hsinchu (TW)

( * ) Notice: Subject to any disclaimer, the term of this patent is extended or adjusted under 35 U.S.C. 154(b) by 98 days.

(21) Appl. No.: 15/081,810

(22) Filed: Mar. 25, 2016

(65) Prior Publication Data

US 2017/0210855 A1    Jul. 27, 2017

(30) Foreign Application Priority Data

Jan. 22, 2016  (TW) .............................. 105102132 A

(51) Int. Cl.
| | | |
|---|---|---|
| *C08G 75/28* | (2006.01) | |
| *C08G 73/00* | (2006.01) | |
| *H01M 10/0525* | (2010.01) | |
| *H01M 4/13* | (2010.01) | |
| *H01M 10/0567* | (2010.01) | |
| *H01M 4/62* | (2006.01) | |
| *H01M 10/052* | (2010.01) | |
| *C08G 73/12* | (2006.01) | |
| *H01M 4/02* | (2006.01) | |

(52) U.S. Cl.
CPC ............. *C08G 75/28* (2013.01); *C08G 73/00* (2013.01); *C08G 73/12* (2013.01); *H01M 4/13* (2013.01); *H01M 4/62* (2013.01); *H01M 10/052* (2013.01); *H01M 10/0525* (2013.01); *H01M 10/0567* (2013.01); *H01M 2004/028* (2013.01)

(58) Field of Classification Search
CPC ......... C08G 75/28; C08G 73/00; H01M 4/13; H01M 10/0525; H01M 10/0567; H01M 2004/028
See application file for complete search history.

(56) References Cited

U.S. PATENT DOCUMENTS

| | | | |
|---|---|---|---|
| 2005/0042519 A1* | 2/2005 | Roh ................ | H01M 10/0525 429/330 |
| 2008/0160405 A1* | 7/2008 | Yang ............... | H01M 4/131 429/215 |
| 2010/0022716 A1* | 1/2010 | Pan ................. | C08G 73/12 525/375 |
| 2010/0130625 A1* | 5/2010 | Chang ............. | C08G 83/005 521/27 |
| 2013/0011362 A1 | 1/2013 | Monahan et al. | |

OTHER PUBLICATIONS

Moad, G-RAFT(Reversible addition-fragmentation chain transfer) crosslinking (co)polymerization of multi-olefinic monomers to form polymer networks, Polym Int 2015, 64, pp. 15-24.*
Jing-Sian Huang, "Study for Polymerization of N,N-Bismaleimide-4,4-Diphenylmethane/Barbituric Acid in the Presence of RAFT Agent," Master Thesis, Department of Chemical Engineering, National Taiwan University of Science and Technology, Jul. 2015, pp. 1-78.
"Office Action of Taiwan Counterpart Application", dated Dec. 28, 2016, p. 1-p. 4.

* cited by examiner

*Primary Examiner* — Anca Eoff
(74) *Attorney, Agent, or Firm* — J.C. Patents

(57) ABSTRACT

An oligomer additive is provided. The oligomer additive is obtained by a reaction of a maleimide, a barbituric acid and a dibenzyl trithiocarbonate. A lithium battery including an anode, a cathode, a separator, an electrolyte solution and a package structure is also provided, wherein the cathode includes the oligomer additive.

8 Claims, 4 Drawing Sheets

OLIGOMER ADDITIVE AND LITHIUM BATTERY

CROSS-REFERENCE TO RELATED APPLICATION

This application claims the priority benefit of Taiwan application serial no. 105102132, filed on Jan. 22, 2016. The entirety of the above-mentioned patent application is hereby incorporated by reference herein and made a part of this specification.

BACKGROUND OF THE INVENTION

Field of the Invention

The invention relates to an oligomer additive, and particularly relates to an oligomer additive for a lithium battery.

Description of Related Art

Since primary batteries are not environment-friendly, the market demand for secondary lithium batteries with characteristics such as rechargeability, light weight, high voltage value, and high energy density has been growing in recent years. As a result, the current performance requirements for the secondary lithium batteries such as light weight, durability, high voltage, high energy density, and high safety have become higher. In particular, the secondary lithium batteries have very high potential in the application and expandability of light electric vehicles, electric vehicles, and the large power storage industry.

However, among the commercialized secondary lithium batteries in the general market, since lithium transition metal oxide is used as the cathode, the cathode readily reacts with the electrolyte solution in high temperature applications and becomes damaged. As a result, oxygen in the lithium metal oxide is released and becomes part of a combustion reaction. This is one of the main causes for the explosion, swelling, and performance degradation of the secondary lithium battery. Therefore, maintaining the structural stability of the cathode material continuously in high temperature applications is one of the desired goals of those skilled in the art.

SUMMARY OF THE INVENTION

The invention provides an oligomer additive having good thermal stability and thermal reactivity. The oligomer additive can be applied to the cathode material of a lithium battery such that the lithium battery still has good performance in a high temperature environment.

The invention provides an oligomer additive obtained by a reaction of a maleimide, a barbituric acid, and a dibenzyl trithiocarbonate.

According to an embodiment of the invention, the molar ratio of the maleimide to the barbituric acid is between 1:1 and 4:1.

According to an embodiment of the invention, the usage amount of the maleimide is 70.8 parts by weight to 90.6 parts by weight, the usage amount of the barbituric acid is 29.2 parts by weight to 9.4 parts by weight, and the usage amount of the dibenzyl trithiocarbonate is 1 part by weight to 10 parts by weight, based on 100 parts by weight of the total weight of the maleimide and the barbituric acid.

According to an embodiment of the invention, the maleimide includes a mono-maleimide or a bismaleimide, wherein the mono-maleimide is selected from the group consisting of N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl) maleimide, and 2,6-xylylmaleimide, and the bismaleimide has a structure represented by formula 1:

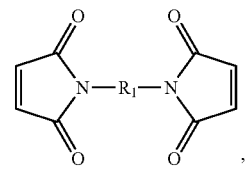

formula 1 wherein $R_1$ includes:

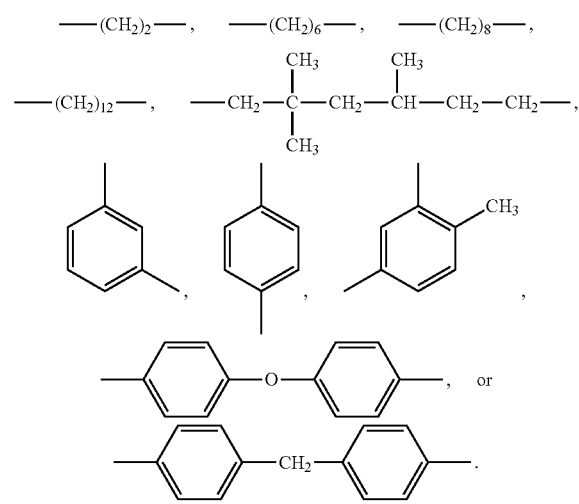

According to an embodiment of the invention, the barbituric acid has a structure represented by formula 2:

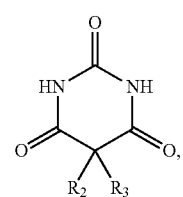

formula 2 wherein $R_2$ and $R_3$ are each independently selected from the group consisting of —H, —$CH_3$, —$C_2H_5$, —$C_6H_5$, —CH($CH_3$)$_2$, —$CH_2$CH($CH_3$)$_2$, —$CH_2CH_2$CH($CH_3$)$_2$, and

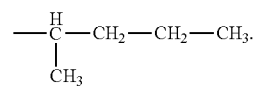

The invention provides a lithium battery including an anode, a cathode, a separator, an electrolyte solution, and a package structure. The cathode and the anode are configured separately, and the cathode includes the aforementioned oligomer additive. The separator is disposed between the anode and the cathode, and the separator, the anode, and the cathode define a housing region. The electrolyte solution is disposed in the housing region. The package structure packages the anode, the cathode, and the electrolyte solution.

According to an embodiment of the invention, the electrolyte solution includes an organic solvent, a lithium salt, and an additive.

According to an embodiment of the invention, the additive includes mono-maleimide, polymaleimide, bismaleimide, polybismaleimide, a copolymer of bismaleimide and mono-maleimide, vinylene carbonate, or a mixture thereof.

Based on the above, the oligomer additive of the invention is prepared by using the maleimide, the barbituric acid, and the dibenzyl trithiocarbonate. Thereby, the oligomer additive can have good thermal stability and thermal reactivity, and reaction rate, conversion, and structure of the oligomer additive can be effectively regulated.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
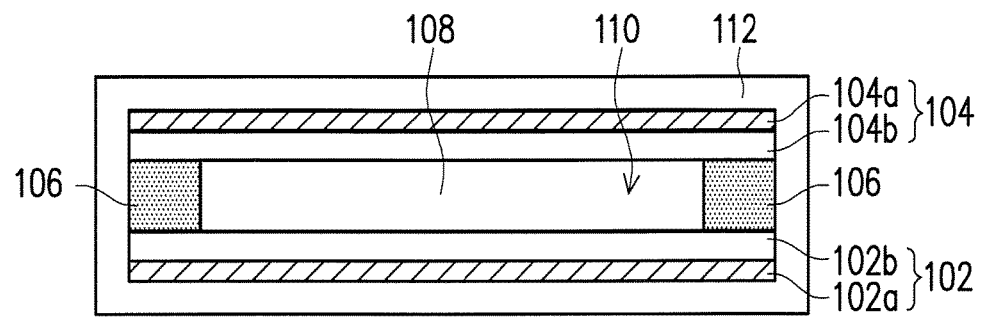
FIG. 1 is a schematic cross-sectional diagram of a lithium battery according to an embodiment of the invention.

In the specification, scopes represented by "a numerical value to another numerical value" are schematic representations in order to avoid listing all of the numerical values in the scopes in the specification. Therefore, the recitation of a specific numerical range covers any numerical value in the numerical range and a smaller numerical range defined by any numerical value in the numerical range, as is the case with any numerical value and a smaller numerical range thereof in the specification.

In order to prepare an oligomer additive which has good thermal stability and thermal reactivity and can be applied to the cathode material of a lithium battery, the invention provides an oligomer additive which can achieve the above advantages. In the following, embodiments are described as examples according to which the present invention can be surely implemented.

An embodiment of the invention provides an oligomer additive obtained by a reaction of a maleimide, a barbituric acid and a dibenzyl trithiocarbonate.

In the present embodiment, the maleimide is a mono-maleimide or a bismaleimide, for example. The mono-maleimide is selected from the group consisting of N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl)maleimide, and 2,6-xylylmaleimide, for example. The bismaleimide may have a structure represented by formula 1:

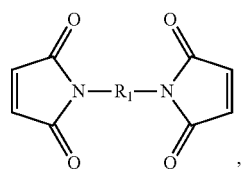

formula 1 wherein $R_1$ includes:

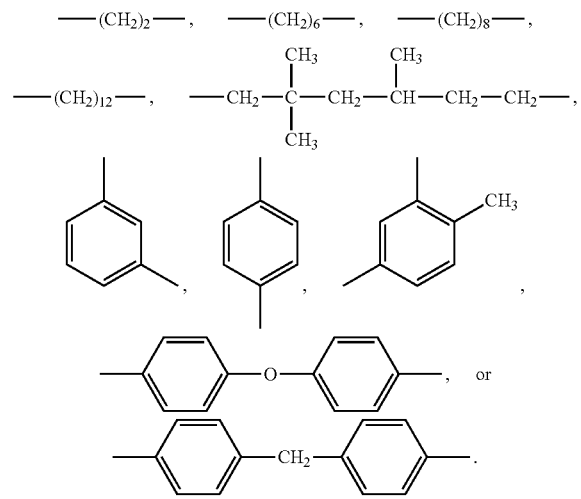

In the present embodiment, the barbituric acid may have a structure represented by formula 2:

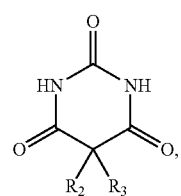

formula 2 wherein $R_2$ and $R_3$ are each independently selected from the group consisting of —H, —CH$_3$, —C$_2$H$_5$, —C$_6$H$_5$, —CH(CH$_3$)$_2$, —CH$_2$CH(CH$_3$)$_2$, —CH$_2$CH$_2$CH(CH$_3$)$_2$, and

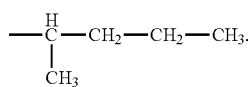

Specifically, in the present embodiment, the oligomer additive is a polymer having a hyperbranched structure and the main chain including trithiocarbonate structure (*—S—C=(S)—S—*, wherein * indicates the binding site) in different molar ratios. More specifically, in the present embodiment, the dibenzyl trithiocarbonate having C=S bond with high reactivity can capture polymer chain radicals generated from free radical addition of the maleimide and the barbituric acid so as to form the radical intermediate of which fragmentation rate is fast enough. Thus, reversible addition-fragmentation change transfer (RAFT) polymerization may occur between the maleimide, the barbituric acid, and the dibenzyl trithiocarbonate. In this way, since the oligomer additive is prepared by using the maleimide, the barbituric acid, and the dibenzyl trithiocarbonate, the oligomer additive can have good thermal stability and thermal reactivity. Also, radical polymerization rate can be delayed by the dibenzyl trithiocarbonate such that reaction rate, conversion, and structure of the oligomer additive can be effectively regulated.

In the text, the "hyperbranched structure" is formed by using the maleimide as an architecture matrix and adding the barbituric acid to the carbon-carbon double bonds of the maleimide through nucleophilic addition to perform branching and ordering polymerization reactions, in which the carbon-carbon double bonds of the maleimide can be opened up allowing the two carbon atoms or one of the two carbon atoms to bond with other atoms.

It should be mentioned that, in the present embodiment, the Michael addition reaction can be performed between the maleimide and the barbituric acid.

Additionally, in the present embodiment, the method of performing the reaction of the maleimide, the barbituric acid, and the dibenzyl trithiocarbonate includes: the maleimide, the barbituric acid, and the dibenzyl trithiocarbonate are dissolved in a solvent and reacted in a temperature of 80° C. to 130° C. for 0.5 hours to 10 hours, for example. Specifically, in the present embodiment, the molar ratio of the maleimide to the barbituric acid is between 1:1 and 4:1, preferably between 2:1 and 3:2. In the present embodiment, the usage amount of the maleimide is 70.8 parts by weight to 90.6 parts by weight, the usage amount of the barbituric acid is 29.2 parts by weight to 9.4 parts by weight, and the usage amount of the dibenzyl trithiocarbonate is 1 part by weight to 10 parts by weight, based on 100 parts by weight of the total weight of the maleimide and the barbituric acid. If the usage amount of the dibenzyl trithiocarbonate is less than 1 part by weight, the RAFT polymerization reaction does not occur; if the usage amount of the dibenzyl trithiocarbonate is more than 10 parts by weight, the reaction rate of the RAFT polymerization reaction is not increased. Additionally, in the present embodiment, the solvent may be an organic solvent, such as N-methyl pyrollidone (NMP), γ-butylolactone (GBL), or propylene carbonate (PC). The solvents mentioned above may be used alone or as a mixture of two or more.

It should be mentioned that, the oligomer additive can be applied to the cathode material of the lithium battery. More specifically, the oligomer additive forms a protective layer on the surface of the cathode material since the oligomer additive has good thermal reactivity. The protective layer can effectively prevent damage to the cathode structure in a high temperature environment, with the reason being: as described above, the oligomer additive has the hyperbranched structure, and therefore the oligomer additive can form a stable organic polymer with the metal oxide in a conventional cathode material and be distributed on the surface thereof. Moreover, since the oligomer additive has high thermal reactivity, high thermal stability, and a rigid chemical structure, the protective layer formed can have high thermal stability. In this way, the lithium battery having a cathode material including the oligomer additive can still have good capacity, battery efficiency, and safety in a high temperature environment and improve the cycle life of the battery.

Additionally, as described above, the reaction rate, the conversion, and the structure of the oligomer additive can be regulated by using the dibenzyl trithiocarbonate. Therefore, storability and applied value of the oligomer additive are increased.

Another embodiment of the invention provides a lithium battery including the oligomer additive according to any of the aforementioned embodiments. Hereinafter, it will be illustrated in detail referring to FIG. 1.

FIG. 1 is a schematic cross-sectional diagram of a lithium battery according to an embodiment of the invention.

Referring to FIG. 1, a lithium battery 100 includes an anode 102, a cathode 104, a separator 106, an electrolyte solution 108, and a package structure 112.

In the present embodiment, the anode 102 includes an anode metal foil 102a and an anode material 102b, wherein the anode material 102b is disposed on the anode metal foil 102a through coating or sputtering. The anode metal foil 102a is a copper foil, an aluminum foil, a nickel foil, or a high conductivity stainless foil, for example. The anode material 102b is carbide or metal lithium, for example. The carbide used as the anode material 102b is carbon powder, graphite, carbon fiber, carbon nanotube, graphene, or a mixture thereof, for example. However, in other embodiments, the anode 102 may only include the anode material 102b.

The cathode 104 and the anode 102 are configured separately. The cathode 104 includes a cathode metal foil 104a and a cathode material 104b, wherein the cathode material 104b is disposed on the cathode metal foil 104a through coating. The cathode metal foil 104a is a copper foil, an aluminum foil, a nickel foil, or a high conductivity stainless foil, for example. The cathode material 104b includes the oligomer additive in any of the aforementioned embodiments and a lithium mixed with transition metal oxide, wherein the content of the oligomer additive is 0.5 parts by weight to 5 parts by weight, preferably 1 part by weight to 3 parts by weight, and the content of the lithium mixed with transition metal oxide is 80 parts by weight to 95 parts by weight, based on 100 parts by weight of the total weight of the cathode material 104b. If the content of the oligomer additive is less than 0.5 parts by weight, safety feature of the battery is not obvious; if the content of the oligomer additive is more than 5 parts by weight, cycle life of the battery is poor. The lithium mixed with transition metal oxide is $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$, or a combination thereof, where $0<x<1$ and Mc is a divalent metal, for example.

Additionally, in an embodiment, the lithium battery 100 may further include a polymer binder, and the polymer binder reacts with the anode 102 and/or the cathode 104 to increase the mechanical properties of the electrode(s). Specifically, the anode material 102b may be adhered to the anode metal foil 102a through the polymer binder, and the cathode material 104b may be adhered to the cathode metal foil 104a through the polymer binder. The polymer binder is polyvinylidene difluoride (PVDF), styrene-butadiene rubber (SBR), polyamide, melamine resin, or a combination thereof, for example.

The separator 106 is disposed between the anode 102 and the cathode 104, and the separator 106, the anode 102, and the cathode 104 define a housing region 110. The material of the separator 106 is an insulating material, for example, and the insulating material may be polyethylene (PE), polypropylene (PP), or a multilayer composite structure of the aforementioned materials, such as PE/PP/PE.

In the present embodiment, the electrolyte solution 108 is disposed in the housing region 110, and the electrolyte solution 108 includes an organic solvent, a lithium salt, and an additive, wherein in the electrolyte solution 108, the addition amount of the organic solvent is 55 wt % to 90 wt %, the addition amount of the lithium salt is 10 wt % to 35 wt %, and the addition amount of the additive is 0.05 wt % to 10 wt %. However, in other embodiments, the additive may not be added into the electrolyte solution 108.

The organic solvent is γ-butylolactone, ethylene carbonate (EC), propylene carbonate (PC), diethyl carbonate (DEC), propyl acetate (PA), dimethyl carbonate (DMC), ethylmethyl carbonate (EMC), or a combination thereof, for example.

The lithium salt is $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, or a combination thereof, for example.

The additive includes mono-maleimide, polymaleimide, bismaleimide, polybismaleimide, a copolymer of bismaleimide and mono-maleimide, vinylene carbonate (VC), or a mixture thereof, for example. The mono-maleimide is, for instance, selected from the group consisting of N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl) maleimide, and 2,6-xylylmaleimide. The bismaleimide may have a structure represented by formula 1 above.

The package structure 112 is used to package the anode 102, the cathode 104, and the electrolyte solution 108. The material of the package structure 112 is an aluminum foil, for example.

It should be mentioned that, the cathode material 104b of the lithium battery 100 includes the oligomer additive and the lithium mixed transition metal oxide, and therefore, as described above, the oligomer additive having the hyperbranched structure and high thermal reactivity can form a stable organic polymer with the lithium mixed transition metal oxide and formula protective layer on the surface of the lithium mixed transition metal oxide. Moreover, since the oligomer additive has high thermal stability and a rigid chemical structure, the protective layer formed can have high thermal stability. In this way, the lithium battery 100 having the cathode material 104b including the oligomer additive can still have good capacity, safety, and battery efficiency in a high temperature environment and improve the cycle life of the battery.

Additionally, the lithium battery 100 including the cathode 104 having the protective layer can be formed in a conventional battery manufacturing process by adding the oligomer additive into the cathode material. Therefore, capacity, battery efficiency, and charge-discharge cycle life of the lithium battery 100 can be effectively maintained at high temperature without modifying any battery design, battery material, and electrolyte solution.

<Experiments>

The invention is more particularly described in the following with reference to experiment examples. Although the following experiments are described, the material used, the material usage amount and ratio, processing details and processing procedures, etc., can be suitably modified without departing from the scope of the invention. Accordingly, restrictive interpretation should not be made to the invention based on the experiments described below.

Experiment 1

Figure 2:
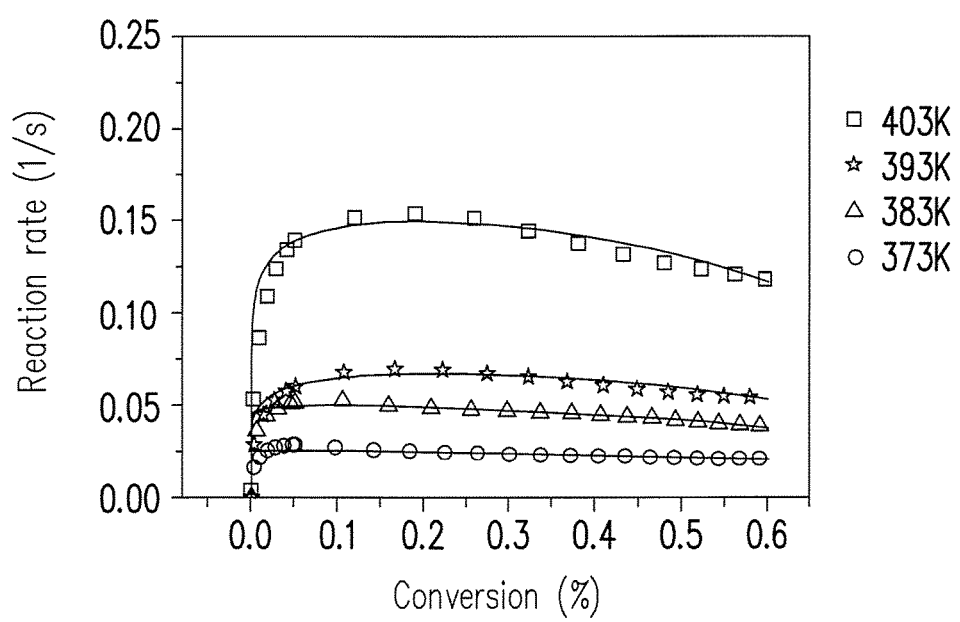
FIG. 2 is a curve diagram illustrating the relationship between conversion (%) and reaction rate (1/s) of the oligomer additive of each of Example 1 to Example 4.
Figure 3:
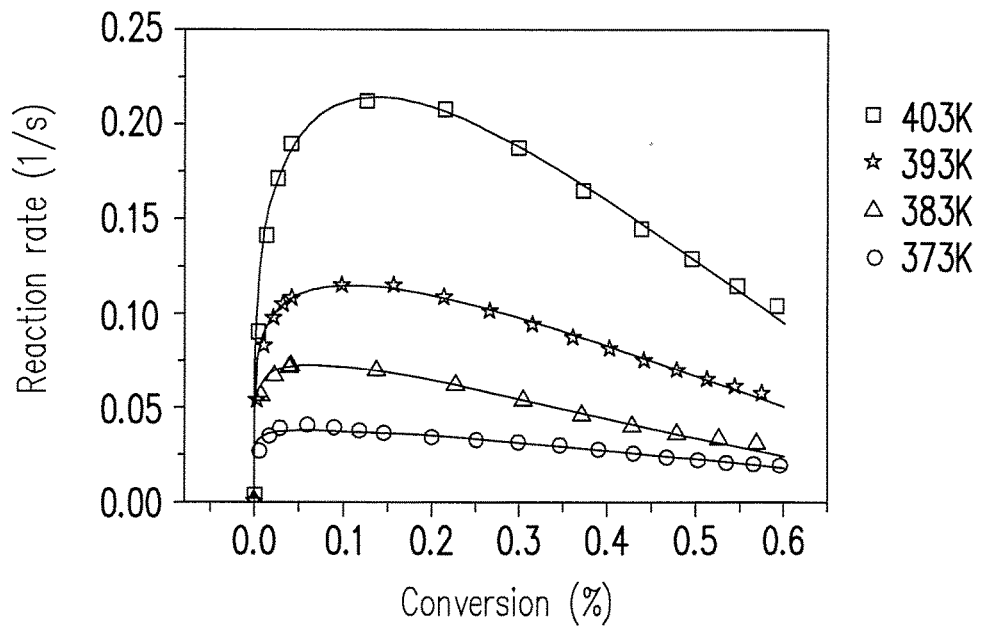
FIG. 3 is a curve diagram illustrating the relationship between conversion (%) and reaction rate (1/s) of the oligomer additive of each of Example 5 to Example 8.
Figure 4:
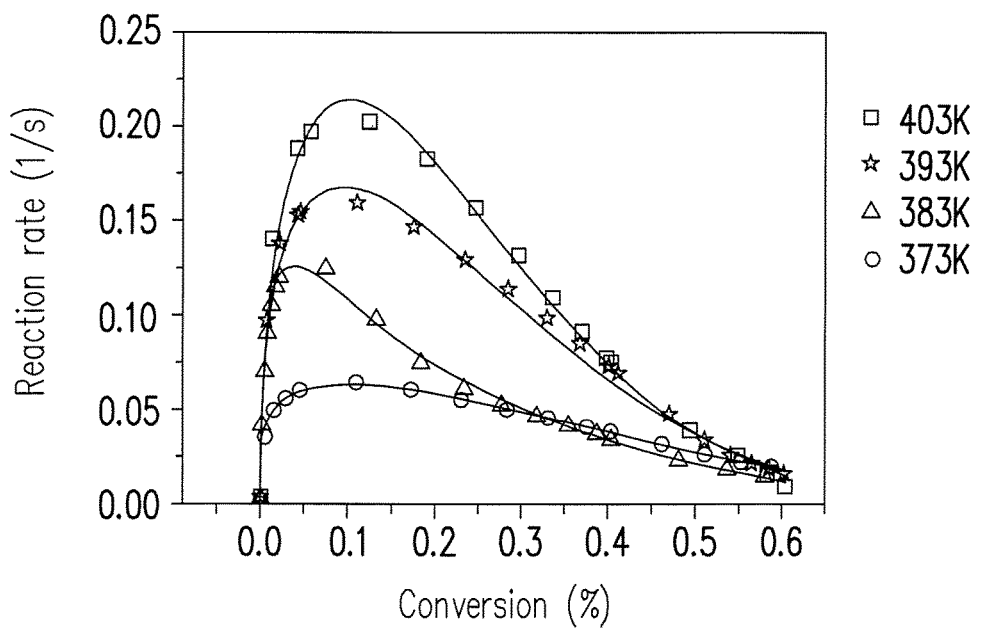
FIG. 4 is a curve diagram illustrating the relationship between conversion (%) and reaction rate (1/s) of the oligomer additive of each of Comparative Example 1 to Comparative Example 4.

Hereinafter, the characteristics of the oligomer additive of the invention are illustrated in detail referring to FIG. 2 to FIG. 4. FIG. 2 is a curve diagram illustrating the relationship between conversion and reaction rate of the oligomer additive of each of Example 1 to Example 4. FIG. 3 is a curve diagram illustrating the relationship between conversion and reaction rate of the oligomer additive of each of Example 5 to Example 8. FIG. 4 is a curve diagram illustrating the relationship between conversion and reaction rate of the oligomer additive of each of Comparative Example 1 to Comparative Example 4.

Example 1

84.8 parts by weight (1 g, 0.0028 mole) of maleimide, 15.2 parts by weight (0.179 g, 0.0014 mole) of barbituric acid, and 10 parts by weight (0.1179 g) of dibenzyl trithiocarbonate were added to 10 g of the N-methyl pyrollidone solvent. The mixed solution was mixed and stirred to react for 1 hour at the temperature of 373 K to prepare the oligomer additive of Example 1, wherein the structural formula of the maleimide is represented by formula 1-1, and the structural formula of the barbituric acid is represented by formula 2-1.

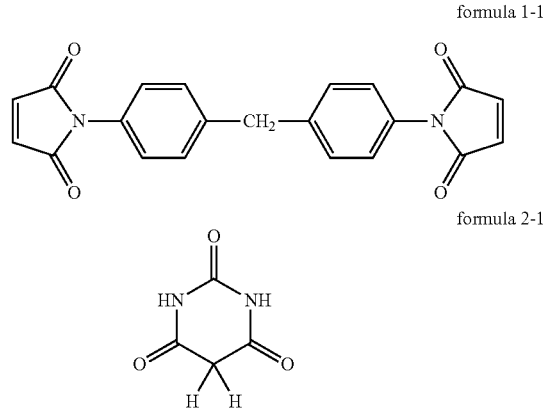

formula 1-1 formula 2-1

Additionally, sampling was performed every 3 minutes in the reaction process, and the conversion and the reaction rate of the oligomer additive of each sample were calculated by the computer analysis software MatLab. The results are shown in FIG. 2.

Example 2

The oligomer additive of Example 2 was prepared following the manufacturing process similar to Example 1. The difference is: the reaction temperature is 383 K and the reaction time is 1 hour in Example 2.

Additionally, sampling was performed every 3 minutes in the reaction process, and the conversion and the reaction rate of the oligomer additive of each sample were calculated by the computer analysis software MatLab. The results are shown in FIG. 2.

Example 3

The oligomer additive of Example 3 was prepared following the manufacturing process similar to Example 1. The difference is: the reaction temperature is 393 K and the reaction time is 1 hour in Example 3.

Additionally, sampling was performed every 3 minutes in the reaction process, and the conversion and the reaction rate of the oligomer additive of each sample were calculated by the computer analysis software MatLab. The results are shown in FIG. 2.

Example 4

The oligomer additive of Example 4 was prepared following the manufacturing process similar to Example 1. The difference is: the reaction temperature is 403 K and the reaction time is 1 hour in Example 4.

Additionally, sampling was performed every 3 minutes in the reaction process, and the conversion and the reaction rate of the oligomer additive of each sample were calculated by the computer analysis software MatLab. The results are shown in FIG. 2.

Example 5

84.8 parts by weight (1 g, 0.0028 mole) of maleimide, 15.2 parts by weight (0.179 g, 0.0014 mole) of barbituric acid, and 5 parts by weight (0.059 g) of dibenzyl trithiocarbonate were added to 10 g of the N-methyl pyrollidone solvent. The mixed solution was mixed and stirred to react for 1 hour at the temperature of 373 K to prepare the oligomer additive of Example 5, wherein the structural formula of the maleimide is represented by formula 1-1 above, and the structural formula of the barbituric acid is represented by formula 2-1 above.

Additionally, sampling was performed every 3 minutes in the reaction process, and the conversion and the reaction rate of the oligomer additive of each sample were calculated by the computer analysis software MatLab. The results are shown in FIG. 3.

Example 6

The oligomer additive of Example 6 was prepared following the manufacturing process similar to Example 5. The difference is: the reaction temperature is 383 K and the reaction time is 1 hour in Example 6.

Additionally, sampling was performed every 3 minutes in the reaction process, and the conversion and the reaction rate of the oligomer additive of each sample were calculated by the computer analysis software MatLab. The results are shown in FIG. 3.

Example 7

The oligomer additive of Example 7 was prepared following the manufacturing process similar to Example 5. The difference is: the reaction temperature is 393 K and the reaction time is 1 hour in Example 7.

Additionally, sampling was performed every 3 minutes in the reaction process, and the conversion and the reaction rate of the oligomer additive of each sample were calculated by the computer analysis software MatLab. The results are shown in FIG. 3.

Example 8

The oligomer additive of Example 8 was prepared following the manufacturing process similar to Example 5. The difference is: the reaction temperature is 403 K and the reaction time is 1 hour in Example 8.

Additionally, sampling was performed every 3 minutes in the reaction process, and the conversion and the reaction rate of the oligomer additive of each sample were calculated by the computer analysis software MatLab. The results are shown in FIG. 3.

Comparative Example 1

84.8 parts by weight (1 g, 0.0028 mole) of maleimide and 15.2 parts by weight (0.179 g, 0.0014 mole) of barbituric acid were added to 10 g of the N-methyl pyrollidone solvent. The mixed solution was mixed and stirred to react for 1 hour at the temperature of 373 K to prepare the oligomer additive of Comparative Example 1, wherein the structural formula of the maleimide is represented by formula 1-1 above, and the structural formula of the barbituric acid is represented by formula 2-1 above.

Additionally, sampling was performed every 3 minutes in the reaction process, and the conversion and the reaction rate of the oligomer additive of each sample were calculated by the computer analysis software MatLab. The results are shown in FIG. 4.

Comparative Example 2

The oligomer additive of Comparative Example 2 was prepared following the manufacturing process similar to Comparative Example 1. The difference is: the reaction temperature is 383 K and the reaction time is 1 hour in Comparative Example 2.

Additionally, sampling was performed every 3 minutes in the reaction process, and the conversion and the reaction rate of the oligomer additive of each sample were calculated by the computer analysis software MatLab. The results are shown in FIG. 4.

Comparative Example 3

The oligomer additive of Comparative Example 3 was prepared following the manufacturing process similar to Comparative Example 1. The difference is: the reaction temperature is 393 K and the reaction time is 1 hour in Comparative Example 3.

Additionally, sampling was performed every 3 minutes in the reaction process, and the conversion and the reaction rate of the oligomer additive of each sample were calculated by the computer analysis software MatLab. The results are shown in FIG. 4.

Comparative Example 4

The oligomer additive of Comparative Example 4 was prepared following the manufacturing process similar to Comparative Example 1. The difference is: the reaction temperature is 403 K and the reaction time is 1 hour in Comparative Example 4.

Additionally, sampling was performed every 3 minutes in the reaction process, and the conversion and the reaction rate of the oligomer additive of each sample were calculated by the computer analysis software MatLab. The results are shown in FIG. 4.

It can be known from FIG. 2 to FIG. 4, the reaction rate of the oligomer additive, which the dibenzyl trithiocarbonate was not used in the manufacturing process, dramatically increased in a short time with the increasing of the reaction temperature; on the contrary, the reaction rate of the oligomer additive, which the dibenzyl trithiocarbonate was used in the manufacturing process, can be appropriately regulated in a certain level at different reaction temperatures. The results indicate that the reaction rate, the conversion, and the structure of the oligomer additive prepared by using the maleimide, the barbituric acid, and the dibenzyl trithiocarbonate can be regulated.

Experiment 2

Figure 5:
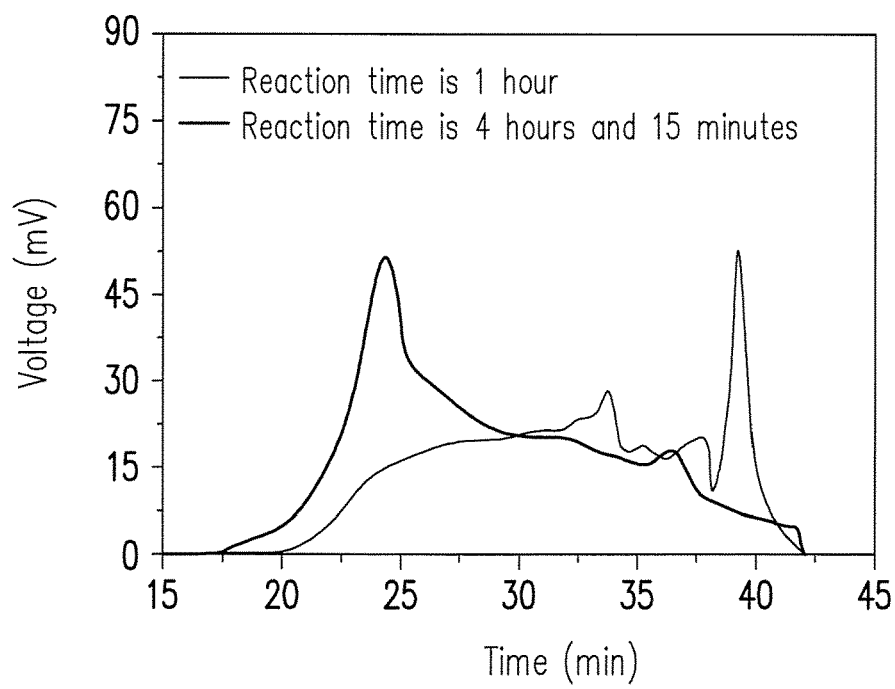
FIG. 5 is a gel permeation chromatography (GPC) diagram of the oligomer additive of Example 9.
Figure 6:
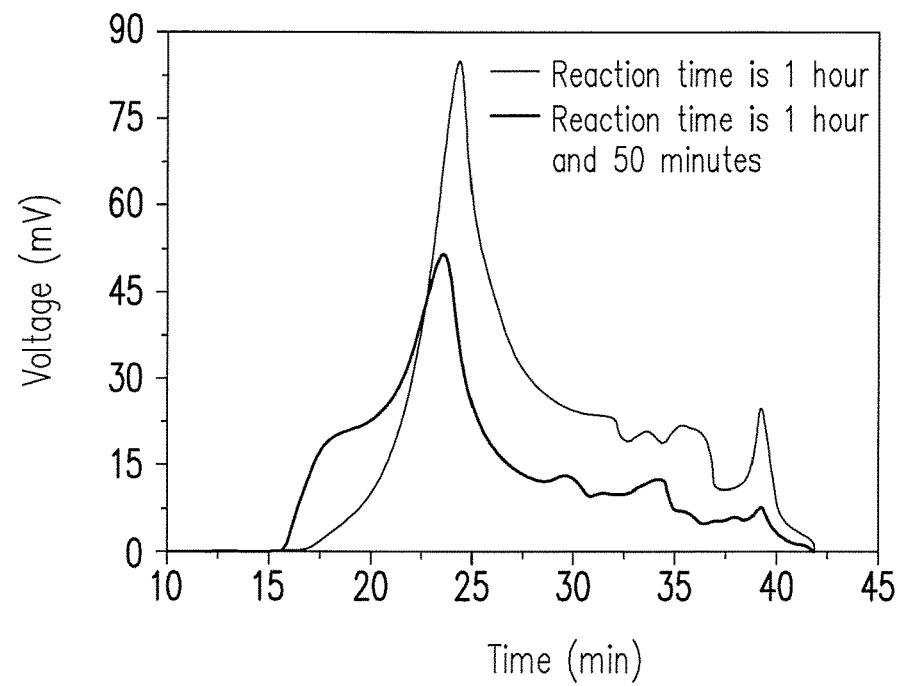
FIG. 6 is a GPC diagram of the oligomer additive of Comparative Example 5.

Hereinafter, the characteristics of the oligomer additive of the invention are illustrated in detail referring to FIG. 5 and FIG. 6. FIG. 5 is a gel permeation chromatography (GPC) diagram of the oligomer additive of Example 9. FIG. 6 is a GPC diagram of the oligomer additive of Comparative Example 5. The measuring instrument is a gel permeation chromatography analyzer (ACQUITY APC™ made by Waters Corporation).

Example 9

84.8 parts by weight (1 g, 0.0028 mole) of maleimide, 15.2 parts by weight (0.179 g, 0.0014 mole) of barbituric acid, and 10 parts by weight (0.1179 g) of dibenzyl trithiocarbonate were added to 10 g of the N-methyl pyrollidone solvent. The mixed solution was mixed and stirred to react for 1 hour at the temperature of 130° C. to prepare the oligomer additive of Example 9, wherein the structural formula of the maleimide is represented by formula 1-1 above, and the structural formula of the barbituric acid is represented by formula 2-1 above.

Additionally, 10 mg was sampled when the reaction time was at 1 hour and at 4 hours and 15 minutes respectively, and the GPC diagram of each sample was measured using the gel permeation chromatography analyzer. The results are shown in FIG. 5.

Comparative Example 5

84.8 parts by weight (1 g, 0.0028 mole) of maleimide and 15.2 parts by weight (0.179 g, 0.0014 mole) of barbituric acid were added to 10 g of the N-methyl pyrollidone solvent. The mixed solution was mixed and stirred to react for 1 hour at the temperature of 130° C. to prepare the oligomer additive of Comparative Example 5, wherein the structural formula of the maleimide is represented by formula 1-1 above, and the structural formula of the barbituric acid is represented by formula 2-1 above.

Additionally, 10 mg was sampled when the reaction time was at 1 hour and at 1 hour and 50 minutes respectively, and the GPC diagram of each sample was measured using the gel permeation chromatography analyzer. The results are shown in FIG. 6.

It can be known from FIG. 5 and FIG. 6, the polymerization reaction of the oligomer additive of Comparative Example 5, which the dibenzyl trithiocarbonate was not used in the manufacturing process, has been nearly completed when the reaction time was at about 1 hour; on the contrary, the polymerization reaction of the oligomer additive of Example 9, which the dibenzyl trithiocarbonate was used in the manufacturing process, has not started yet when the reaction time was at 1 hour, and has tended to be completed until the reaction was at about 4 hours. The results indicate that by using the maleimide, the barbituric acid, and the dibenzyl trithiocarbonate to prepare the oligomer additive, the reaction rate, the conversion, and the structure of the oligomer additive can be regulated.

Experiment 3

Figure 7:
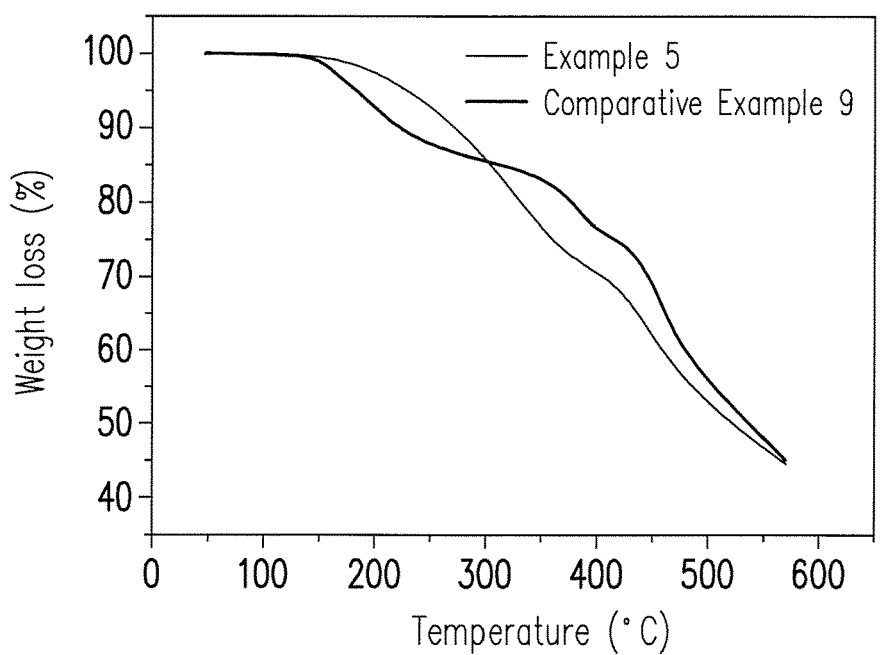
FIG. 7 is a thermogravimetric analysis diagram of the oligomer additive of each of Example 9 and Comparative Example 5.

For the oligomer additive of each of Example 9 and Comparative Example 5, thermal property analysis was performed using the thermogravimetric analyzer (Q500 made by TA Corporation). The measurement results are shown in FIG. 7. It can be known from FIG. 7, compared to the oligomer additive of Comparative Example 5, which the dibenzyl trithiocarbonate was not used in the manufacturing process, the oligomer additive of Example 9, which the dibenzyl trithiocarbonate was used in the manufacturing process, had better thermal stability at equal to or less than 300° C. The results indicate that by using the maleimide, the barbituric acid, and the dibenzyl trithiocarbonate to prepare the oligomer additive, the oligomer additive can have good thermal stability.

Experiment 4

Hereinafter, the characteristics of the lithium battery of the invention are illustrated in detail by Example 10 and Comparative Example 6.

Example 10

Preparation of Anode

Metal lithium was cut into an appropriate shape and directly inserted to form the anode.

Preparation of Cathode 90 parts by weight of lithium cobalt oxide ($LiCoO_2$), 5 parts by weight of polyvinylidene difluoride (PVDF), and 5 parts by weight of acetylene black (conductive powder) were evenly mixed in the N-methyl pyrollidone solvent. Next, 0.5 parts by weight of the oligomer additive of Example 9 was added to the mixed solution to form a cathode material. Then, after the cathode material was coated on an aluminum foil, the aluminum foil with the cathode material coated thereon was dried, compressed, and then cut to form the cathode.

Preparation of Electrolyte Solution $LiPF_6$ was dissolved in a mixture solution of propylene carbonate (PC), ethylene carbonate (EC), and diethyl carbonate (DEC) (volume ratio EC/PC/DEC=3/2/5) to prepare an electrolyte solution at the concentration of 1M, wherein the mixture solution was used as the organic solvent in the electrolyte solution, and $LiPF_6$ was used as the lithium salt in the electrolyte solution.

Fabrication of Lithium Battery

After the anode and the cathode were separated by using polypropylene as the separator and the housing region was defined, the above electrolyte solution was added into the housing region between the anode and the cathode. Lastly, the above structure was packaged with the package structure to complete the fabrication of the lithium battery of Example 10.

Comparative Example 6

The lithium battery of Comparative Example 6 was fabricated following the manufacturing process similar to Example 10. The difference is: the cathode material includes the oligomer additive of Comparative Example 5 in the lithium battery of Comparative Example 6; while the cathode material includes the oligomer additive of Example 9 in the lithium battery of Example 10.

Figure 8:
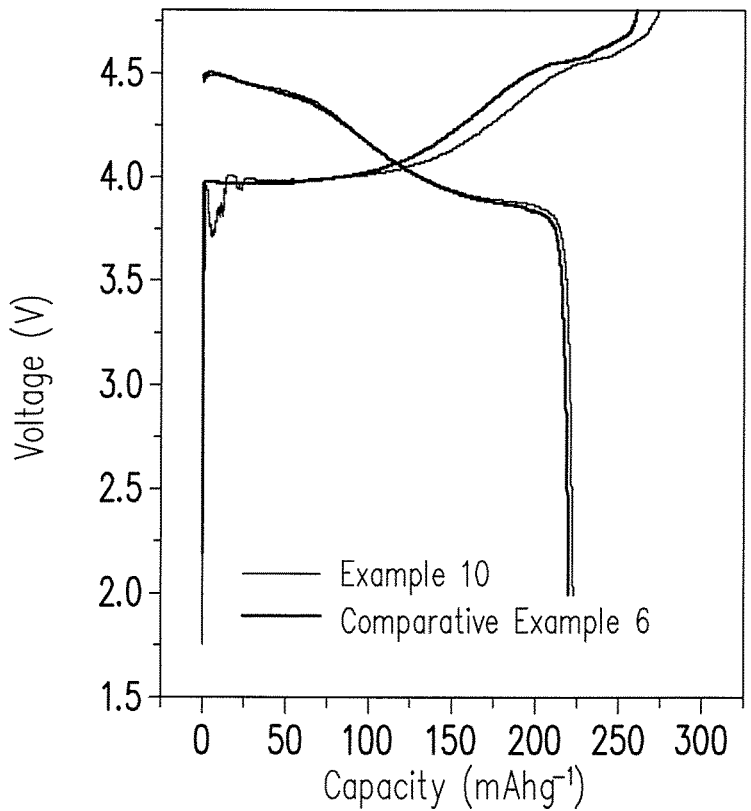
FIG. 8 is a diagram illustrating the charge and discharge curve of the lithium battery of each of Example 10 and Comparative Example 6 at room temperature.

Next, charge-discharge performance test was performed on the lithium battery of each of Example 10 and Comparative Example 6, and the measurement results are shown in FIG. 8.

The lithium battery of each of Example 10 and Comparative Example 6 was charged and discharged with a constant current/voltage at room temperature (30° C.) by using the potentiostat (VMP3 made by Biologic Corporation). First, the batteries were charged to 4.2 V with a constant current of 0.2 C until the current was less than or equal to 0.01 C. Then, the batteries were discharged to the cut-off voltage (3 V) with a constant current of 0.2 C. FIG. 8 is a diagram illustrating the charge and discharge curve of the lithium battery of each of Example 10 and Comparative Example 6 of the invention at room temperature.

It can be known from FIG. 8, the discharge capacity of 219 mAh/g of the lithium battery of Comparative Example 6 was slightly less than the discharge capacity of 222 mAh/g of the lithium battery of Example 10. In other words, compared to the lithium battery of Comparative Example 6, the lithium battery, of which cathode having the oligomer additive, of Example 10 has higher discharge capacity at room temperature.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An oligomer additive is obtained by a reaction of a maleimide, a barbituric acid and a dibenzyl trithiocarbonate.

2. The oligomer additive according to claim 1, wherein a molar ratio of the maleimide to the barbituric acid is between 1:1 and 4:1.

3. The oligomer additive according to claim 1, wherein a usage amount of the maleimide is 70.8 parts by weight to 90.6 parts by weight, a usage amount of the barbituric acid is 29.2 parts by weight to 9.4 parts by weight, and a usage amount of the dibenzyl trithiocarbonate is 1 part by weight to 10 parts by weight, based on 100 parts by weight of a total weight of the maleimide and the barbituric acid.

4. The oligomer additive according to claim 1, wherein the maleimide comprises a mono-maleimide or a bismaleimide, wherein the mono-maleimide is selected from the group consisting of N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl) maleimide, and 2,6-xylylmaleimide, and the bismaleimide has a structure represented by formula 1:

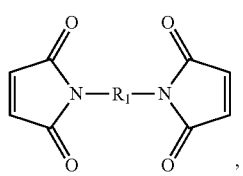

formula 1 wherein $R_1$ comprises:

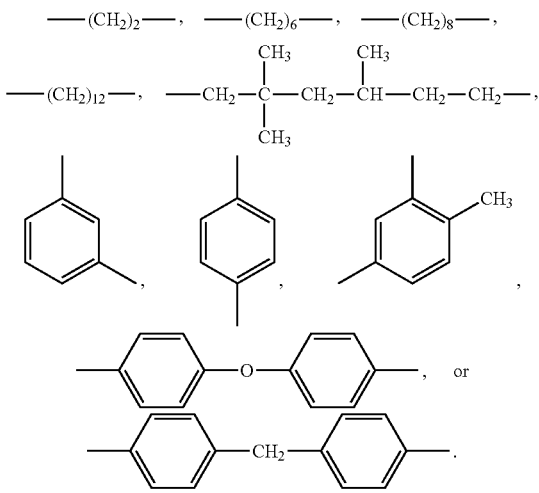

5. The oligomer additive according to claim 1, wherein the barbituric acid has a structure represented by formula 2:

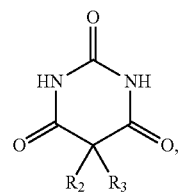

formula 2 wherein $R_2$ and $R_3$ are each independently selected from the group consisting of —H, —CH$_3$, —C$_2$H$_5$, —C$_6$H$_5$, —CH(CH$_3$)$_2$, —CH$_2$CH(CH$_3$)$_2$, —CH$_2$CH$_2$CH(CH$_3$)$_2$, and

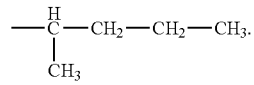

6. A lithium battery, comprising:
an anode;
a cathode configured separately from the anode, wherein the cathode comprises the oligomer additive according to claim 1;
a separator disposed between the anode and the cathode, wherein the separator, the anode, and the cathode define a housing region;
an electrolyte solution disposed in the housing region; and
a package structure packaging the anode, the cathode, and the electrolyte solution.

7. The lithium battery according to claim 6, wherein the electrolyte solution comprises an organic solvent, a lithium salt, and an additive.

8. The lithium battery according to claim 7, wherein the additive comprises mono-maleimide, polymaleimide, bismaleimide, polybismaleimide, a copolymer of bismaleimide and mono-maleimide, vinylene carbonate, or a mixture thereof.

* * * * *